United States Patent [19]

Nakayama et al.

[11] Patent Number: 5,821,295

[45] Date of Patent: Oct. 13, 1998

[54] RESINOUS COMPOSITION FOR TWO LIQUID TYPE WATER PAINT CROSSLINKABLE AT NORMAL TEMPERATURE

[75] Inventors: Yasuharu Nakayama; Reijiro Nishida, both of Kanagawa, Japan

[73] Assignee: Kansai Paint Co., Ltd., Hyogo, Japan

[21] Appl. No.: 667,370

[22] Filed: Jun. 21, 1996

Related U.S. Application Data

[63] Continuation of Ser. No. 313,465, Sep. 27, 1994, abandoned.

[30] Foreign Application Priority Data

Aug. 12, 1994 [JP] Japan .................................. 6-220743

[51] Int. Cl.$^6$ ........................................................ C05L 33/06
[52] U.S. Cl. ........................... 524/555; 524/556; 524/560
[58] Field of Search .................................. 524/560, 556, 524/555, 558; 427/355.5, 393.5

[56] References Cited

U.S. PATENT DOCUMENTS

| | | | |
|---|---|---|---|
| 4,267,091 | 5/1981 | Geelhaar et al. | 524/189 |
| 4,894,261 | 1/1990 | Gulbins et al. | 427/379 |
| 5,141,983 | 8/1992 | Hasegawa et al. . | |
| 5,147,926 | 9/1992 | Meichsner et al. . | |
| 5,348,997 | 9/1994 | Kato et al. | 524/560 |

FOREIGN PATENT DOCUMENTS

| | | |
|---|---|---|
| 332326 | 9/1989 | European Pat. Off. . |
| 367051 | 5/1990 | European Pat. Off. . |
| 545081 | 6/1993 | European Pat. Off. . |
| 05098071 | 4/1993 | Japan . |
| 5-98071 | 4/1993 | Japan . |
| 05247376 | 9/1993 | Japan . |
| 5-247371 | 9/1993 | Japan . |
| 5-320299 | 12/1993 | Japan . |
| 5-339542 | 12/1993 | Japan . |

OTHER PUBLICATIONS

Chemical Abstracts No. 273199q, vol. 120, No. 11, May 1994, Manufacture of Aqueous Emulsions of Acrylic Polyurethanes (English Abstract of Japanese Patent No. 5–320299 above).

*Primary Examiner*—Jeffrey T. Smith
*Attorney, Agent, or Firm*—Beveridge, DeGrandi, Weilacher & Young, L.L.P.

[57] ABSTRACT

A resinous composition for two-liquid type water paint crosslinkable at the normal temperature which has a long pot life and which is superior in properties such as hardness, gloss, solvent resistance and water resistance is disclosed. A resinous composition comprises: (A) a colloidal dispersion or emulsion obtained by copolymerizing a monomer mixture comprising a carbonyl group-containing unsaturated monomer, carboxyl group-containing unsaturated monomer and other unsaturated monomers to form a copolymer, neutralizing the copolymer with an alkali, dissolving or emulsifying it into water, and adjusting the pH to above 7; and (B) an easily water soluble dihydrazide compound having from 1 to 5 carbon atoms.

12 Claims, No Drawings

RESINOUS COMPOSITION FOR TWO LIQUID TYPE WATER PAINT CROSSLINKABLE AT NORMAL TEMPERATURE

This application is a continuation of application Ser. No. 08/313,465, filed Sep. 27, 1994 now abandoned, which application is entirely incorporated herein by reference.

BACKGROUND OF THE INVENTION

This invention relates to a resinous composition for two-liquid type water paint crosslinkable at normal temperatures, by which paint film having superior hardness, physical properties, gloss, solvent resistance, water resistance and the like can be formed.

Disadvantages of the paint film obtained from an emulsion paint are that it shows tackiness at a high temperature state, and that its solvent resistance and initial water resistance before sufficient fusing of particles are poor. In order to improve these properties, it is generally known to introduce a carbonyl group and crosslink by adding dihydrazide as a crosslinking agent. As one method to utilize such emulsions, a process is disclosed in Japanese Laid-open Patent No. 4-372674/1992 wherein a carbonyl group is introduced into emulsion particles and the surfaces of the emulsion particles are controlled skillfully without contact with the crosslinking agent in the paint state, to obtain a one liquid type paint. Furthermore, an improved method is disclosed in Japanese Laid-open Patent No. 5-98071/1993 wherein a part of the emulsion is treated to be soluble and whereby contactability and water resistance are improved.

However, in the processes to form a paint film by using the emulsion made by emulsion polymerization together with such surfactants to fuse particles, the properties of the paint film such as hardness, physical properties, gloss, solvent resistance and the like which are equivalent to those of a solvent type two-liquid resinous composition for urethane paints cannot be obtained.

In order to obtain such properties, it is necessary to use resins such as a colloidal dispersion obtained by dispersing a polymer having a hydrophilic portion into water or a dispersive emulsion, wherein the main action of film formation is a crosslinking reaction. In such cases, there cannot be obtained one-liquid type paint by using the above mentioned particles because of non-clear particle states, and unavoidably becomes a two-liquid type paint.

It was an object of this invention to obtain a resinous composition for paint crosslinkable at normal temperatures which exhibits the equal hardness, physical properties, gloss, a solvent resistance and water resistance equivalent to those of a solvent type two-liquid urethane paint even as an aqueous resinous composition.

SUMMARY OF THE INVENTION

Applicants have studied the crosslinking reaction between carbonyl group and dihydrazide in a disperse type aqueous resin for the purpose of forming a resinous composition for paint based on a resinous composition for a two-liquid type water paint having properties equal to the solvent type two-liquid paint.

The first aspect of the present invention is a resinous composition for two-liquid type water paint crosslinkable at the normal temperature, which comprises (A) a colloidal dispersion or emulsion (referred simply to as "emulsion (A)" hereinafter) obtained by copolymerizing a monomer mixture comprising from 5 to 40% by weight of a carbonyl group-containing unsaturated monomer, from 1 to 20% by weight of a carboxyl group-containing unsaturated monomer and from 40% to 94% by weight of other unsaturated monomers to form a copolymer, neutralizing the copolymer with an alkali, dissolving or emulsifying it into water, and adjusting Ph value above 7, as well as (B) from 0.05 to 1.0 mole equivalent (based on the carbonyl group content contained in the said emulsion (A)) of readily water soluble dihydrazide compound (hereinafter referred to as "dihydrazide compound") having from 1 to 5 carbon atoms.

The second aspect of the present invention is the resinous composition for two-liquid type water paint crosslinkable at the normal temperature according to the first aspect, wherein the copolymer to form particles of the emulsion (A) has a number average molecular weight of 500–150,000.

The third aspect of the present invention is the resinous composition for two-liquid type water paint crosslinkable at normal temperatures according to the first aspect, wherein the emulsion (A) is an emulsion having pH of above 7.

The fourth aspect of the present invention is the resinous composition for two-liquid type water paint crosslinkable at normal temperatures according to the first aspect, wherein the emulsion (A) is obtainable by copolymerizing a monomer mixture comprising from 5 to 40% by weight of a carbonyl group-containing unsaturated monomer, from 1 to 20% by weight of a carboxyl group-containing unsaturated monomer, from 5 to 40% by weight of a higher alkyl ester monomer of methacrylic acid having 9 to 30 carbons and from 5 to 89% by weight of other unsaturated monomers.

The fifth aspect of the present invention is the resinous composition for two-liquid type water paint crosslinkable at normal temperatures according to any of the first to fourth aspects of the present invention, wherein the hydrazide compound (B) is one or two compounds selected from the group consisting of those expressed by the general formula (1) and (2) below:

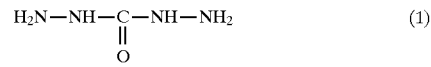

(1)

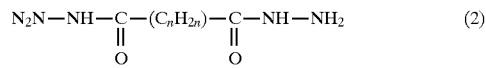

(2)

(n=0 to 3), as well as malonic dihydrazide, maleic dihydrazide, itaconic dihydrazide and fumaric dihydrazide.

The sixth aspect of the present invention is the resinous composition for two-liquid type water paint crosslinkable at normal temperatures according to the fifth aspect, wherein the hydrazide compound (B) is either (1) or (2) above.

PREFERRED EMBODIMENTS OF THE INVENTION

The invention is based on the following three novel findings.

(1) In order to obtain the objective of high properties, it is necessary to increase the crosslinking density and thus increase the amount of a crosslinking agent. As a result, the crosslinking reaction proceeds faster and pot life becomes too short, but the time of the pot life can be controlled by increasing Ph value upwardly.

(2) By using adipic dihydrazide as is conventionally used in this field, the surface gloss is lost when dried in the case of large amounts of it being used. This tendency is strong particularly in a high pH range, but it can be solved by using a specific strong hydrophilic dihydrazide.

(3) The dispersive type emulsion (A) used in the inversion may include long chain monomers of higher alkylesters of methacyclic acid having 9 to 30 carbon atoms (hereinafter referred to as "long chain monomer"). By including the long chain monomer in the dispersive emulsion (A), water resistance and adhesion capability by means of entanglement of long chain monomer which is the hydrophobic component of the paint coating, even though the paint coating contains plenty of hydrophilic component.

The emulsion (A) used in the invention is prepared by copolymerizing a mixture of a carbonyl group-containing unsaturated monomer, a carboxyl group-containing unsaturated monomer, the long chain monomer and other unsaturated monomers or the mixture excluding the long chain monomer by means of any known polymerization method such as solution polymerization, bulk polymerization and the like, to obtain a polymer, neutralizing the polymer with an alkali, and dissolving or dispersing it into water.

The said emulsion (A) is different considerably in molecular weight of polymer which is to constitute the emulsion particles from the emulsion formed by an emulsion polymerization method using a surfactant. For example, the number average molecular weight is advantageously within a range of 500–150,000, preferably 1,000–80,000 in order to obtain a stable emulsion.

On the other hand, the number average molecular weight prepared by an emulsion polymerization method is generally 150,000–1,000,000, and furthermore those having higher molecular weight are also included, wherein a part becomes a gel.

As the carbonyl group-containing monomer used in synthesis of the emulsion according to the invention, there may be mentioned acrolein, diacetone acrylamide, diacetone methacrylamide, formyl styrol, vinyl alkyl ketones having 4–7 carbon atoms (such as vinyl methyl ketone, vinyl ethyl ketone, vinyl butyl ketone), diacetone acrylate, diacetone methacrylate, acetonitrile acrylate, 2-hydroxypropyl acrylate acetyl acetate, butane diol 1,4-acrylate acetyl acetate, acryl (or methacryl) oxyalkyl propenal, acetoacetoxyethyl methacrylate, acetoacetoxyethyl acrylate and the like. Particularly preferable are diacetone acrylamide and diacetone methacrylamide which are easily controllable in their reaction rates by means of Ph. The used amount thereof is 5–40% by weight, preferably 7–30% by weight, more preferably 10–25% by weight.

The carboxyl group-containing monomers are monomers generally used in the synthesis of water-soluble resins, and include for example acrylic acid, methacrylic acid, itaconic acid, maleic acid and the like. The used amount thereof is 1–20% by weight, preferably 2–10% by weight.

Further, the long chain monomer of the present invention as a copolymerizing component is used to improve water resistance of the paint coating and adhesion capability of the coating on a metal surface adhered after the metal surface is dipped into water. As an example of the long chain monomer, methacrylic acid of higher alkyl ester having 9 to 30 carbon atoms is mentioned. The long chain monomer contains an alkyl group having a long chain of carbon which is longer than $C_9$. The hydrophobic side chains of the long chain monomer are entangled enough with each other to remarkably increase the water resistance of the paint coating. Further, the long chain monomer has a strong hydrophobic property which prevents copolymerization, and may not normally be introduced into an emulsion for emulsion polymerization in which a surfactant is used. However, in accordance with the present invention, the long chain monomer may be copolymerized by means of the solution polymerization, and the resultant copolymer may easily become an emulsion by means of neutralization by alkali and water dispersion.

The long chain monomer may be an alkyl ester having $C_9$ to $C_{30}$ of methacrylic acid, preferably $C_{12}$ to $C_{26}$, further preferably $C_{16}$ to $C_{22}$. For example, nonyl methacrylate ($C_9$), decyl ($C_{10}$), undecyl ($C_{11}$), dodecyl (lauryl) ($C_{12}$), tridecyl ($C_{13}$), hexadecyl ($C_{16}$), heptadecyl ($C_{17}$), octadecyl (stearyl) ($C_{18}$), eicocyl ($C_{20}$) or behenyl ($C_{22}$). The contents of the long chain monomer is 5 to 40% by weight.

The other monomers to be copolymerized with the above mentioned three monomers are not subjected to any limitation, and include, for example, styrene, acrylic or methacrylic esters with side-chains having 1 to 8 carbon atoms, acrylonitrile, butadiene, vinyl toluene, methacrylonitrile, vinyl acetate, vinyl chloride, vinylidene chloride, olefins and the like. The used amount thereof is 5 to 89% by weight, preferably 20 to 80% by weight.

The dihydrazide compound (B) used as a crosslinking agent according to the invention should have sufficient water-solubility. There may be mentioned, for example, carbodihydrazide expressed by the following chemical formulae:

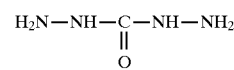

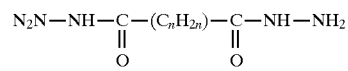

(n=0 to 3).

Furthermore, there may be mentioned malonic dihydrazide, maleic dihydrazide, itaconic dihydrazide, fumaric dihydrazide and the like. Preferably, n=0 or 1 in the above-mentioned formula, and carbodihydrazide is particularly preferable. The used amount thereof is 0.05 to 1 mole equivalent based on carbonyl group content (0.1 to 2 as functional group ratio), preferably 0.1 to 0.6 more preferably 0.15 to 0.5 mole equivalent.

The neutralizing agent used in the invention is ammonia, a low molecular weight amine or an alkali metal. The pH value of the emulsion (A) is adjusted above 7, preferably 8 to 11. It is more preferably 8.5 to 10.5.

If the amount of the crosslinking agent used in the invention is less than the above-mentioned range, the desired properties thereof is less effectively obtained, but even if too much, the effect is relatively small. If the Ph value is below 7, the reaction proceeds too fast to shorten the pot life.

The invention has developed the resinous composition for two-liquid type water paint crosslinkable at the normal temperature, but crosslinking can be carried out more thoroughly by heating. During paint forming, pigments, extenders, thickeners, and other conventional additives are added. Furthermore, adhesives and the like may be applied.

The invention is illustrated in more detail by the following examples.

EXAMPLE 1

150 parts by weight of ethylene glycol monobutyl ether was introduced into a 2 liter flask, heated to 110° C., and substituted by nitrogen, and the following mixture was added dropwise for 1 hour:

| | |
|---|---|
| Acrylic acid | 10 parts by weight |
| Diacetone acrylamide | 30 parts by weight |
| Butyl acrylate | 50 parts by weight |
| Styrene | 30 parts by weight |
| Methyl methacrylate | 29 parts by weight |
| Allyl methacrylate | 1 part by weight |
| Azobisisobutyronitrile | 3 parts by weight |

After the end of addition, it was kept at 110° C. for 30 minutes, and then the following mixture was added dropwise for 1 hour:

| | |
|---|---|
| Diacetone acrylamide | 30 parts by weight |
| Butyl acrylate | 55 parts by weight |
| Styrene | 33 parts by weight |
| Methyl methacrylate | 32 parts by weight |
| Azobisisobutyronitrile | 1.5 parts by weight. |

One hour and one hour-and-half after the end of addition, 0.5 parts by weight of azobisisobutyronitrile was added, the mixture was kept 110° C. for further 2 hours, then cooled to 70° C., and 14 parts by weight of triethylamine was added, 500g of deionized water was added with stirring, to obtain an aqueous solution having high viscosity. The Ph value thereof was 8.6. The number average molecular weight calculated from the result of gel chromatography was 13,800.

To 50 parts by weight of the solution, 10 parts by weight of deionized water and 0.8 parts by weight carbodihydrazide were added. The solution was shown in Table 1 respectively. After the retention period, the solution was coated on the treating plate, dried for 3 days, and thereafter the painting properties were tested. The results are shown in Table 1.

TABLE 1

| Hours/Days after | Properties of Three Days After Painting | | | | |
|---|---|---|---|---|---|
| Adding Carbodihydrazide Mixing | Film thickness (μm) | Pencil Hardness | Solvent Resistance | Erichsen Value | Gloss |
| Immediately after | 20 | 2H | ◯ | 7 mm< | ◯ |
| 2 hours after | 19 | 2H | ◯ | 7 mm< | ◯ |
| 6 hours after | 18 | 2H | ◯ | 7 mm< | ◯ |
| 1 day after | 18 | 2H | ◯ | 7 mm | ◯⁻ |
| 2 days after (Thickened) | 21 | H | ◯⁻ | 5 mm | ◯ |

Solvent resistance was obtained by rubbing with a cloth moistened with xylene for 10 times and observing the change.

In the case that 1.6 parts by weight or 0.8 parts by weight of adipic dihydrazide was added, there was no gloss observed.

"O" in table 1, as well as tables below, shows that satisfactory results have been obtained.

EXAMPLE 2

150 parts by weight of propylene glycol monoethyl ether was introduced into a 2 liter flask, heated to 110° C., and substituted by nitrogen, and the following mixture was added dropwise for 2 hours:

| | |
|---|---|
| Acrylic acid | 10 parts by weight |
| Diacetone acrylamide | 60 parts by weight |
| Butyl acrylate | 105 parts by weight |
| Styrene | 65 parts by weight |
| Methyl methacrylate | 60 parts by weight |
| Azobisisobutyronitrile | 9 parts by weight. |

After the end of addition, it was kept at 110° C. for 30 minutes, and 30 minutes and 1 hour after, 0.5 parts by weight of azobisisobutyronitrile was added respectively, kept at 110° C. for 2 hours, cooled, and then 14 parts by weight of triethylamine and 50 parts by weight of isopropanol were added, stirred thoroughly, and thereafter 600g of deionized water was added dropwise. The aqueous solution was concentrated to solid content of 36% under a decreased pressure, to obtain an aqueous solution having pH of 8.8. The number average molecular weight calculated from the result of gel chromatography was 6,529.

Test results of the painted film obtained by using 50 parts by weight of the solution and blending carbodihydrazide shown in Table 2 are also shown in Table 2.

TABLE 2

| Carbodihydrazide (Parts by weight) | Film thickness (μm) | Water resistance 2 hrs. submerged | Gloss | Pencil hardness |
|---|---|---|---|---|
| 0.8 | 20 | ◯⁻ | ◯ | 2H |
| 0.6 | 21 | ◯ | ◯ | H–2H |
| 0.4 | 19 | ◯⁻ | ◯ | F |

Tests were carried out 2 days after painting.

The results of Erichsen test were determined after 7 days, and for that wherein 0.6 parts by weight of carbohydrazide being added, the result was 7mm.

EXAMPLE 3

150 parts by weight of propylene glycol monoethyl ether was introduced into a 2 liter flask, heated to 110° C., and substituted by nitrogen, and the following mixture was added dropwise for 2 hours:

| | |
|---|---|
| Acrylic acid | 10 parts by weight |
| Diacetone acrylamide | 90 parts by weight |
| Butyl acrylate | 70 parts by weight |
| Butyl methacrylate | 65 parts by weight |
| Styrene | 65 parts by weight |
| Azobisisobutyronitrile | 9 parts by weight |

After the end of addition, it was kept at 110° C., and 30 minutes and 1 hour after, 0.5 parts by weight of azobisisobutyronitrile was added respectively, kept at 110° C. for 2 hours, cooled, and then 14 parts by weight of triethylamine and 50 parts by weight of isopropanol were added, stirred thoroughly, and thereafter 450g of deionized water was added dropwise. The aqueous solution was concentrated to solid content of 45.1% under a decreased pressure to obtain an aqueous solution having pH of 8.66. The number average molecular weight calculated from the result of gel chromatography was 7,274.

To 40 parts by weight of the solution, 0.12 parts by weight of carbohydrazide was added, and after 40 minutes, the paint film coated on the treating plate expressed the following properties:

| | |
|---|---|
| Film thickness | 25 μm |
| Water resistance (2 hours after submerged into water) | ○ |
| Gloss | ○ |
| Pencil hardness | 2H |
| Erichsen test value | 5 mm |

EXAMPLE 4

300 parts by weight of propylene glycol monoethyl ether was introduced into a 2 liter flask, heated to 110° C., and substituted by nitrogen, and the following mixture was added dropwise for 2 hours:

| | |
|---|---|
| Acrylic acid | 60 parts by weight |
| Diacetone acrylamide | 60 parts by weight |
| Butyl acrylate | 90 parts by weight |
| Methyl methacrylate | 90 parts by weight |
| Azobisisobutyronitrile | 9 parts by weight. |

After the end addition, it was kept at 110° C., and after 1 hour and 2 hours, 1 part by weight of azobisisobutyronitrile was added respectively, kept at 110° C. for 2 hours, cooled, and then 84 parts by weight of triethylamine was added, and 300g of demineralized water was added, to obtain an aqueous solution having pH of 10.50. The number average molecular weight calculated from the result of gel chromatography was 15,050.

1 part by weight of carbohydrazide was added to 50 parts by weight of the solution to form a product useful for 3 hours. Hardness of the paint film with paint thickness of 23 μm was 2H after 7 days.

COMPARATIVE EXAMPLE

Polymerization was carried out analogously to Example 4, and after cooled, 25 parts by weight of triethylamine was added with stirring, and then 300 parts by weight of deionized water was added, to obtain an aqueous solution with pH of 6.12. The number average molecular weight calculated from the result of gel chromatography was 15,050.

1 part by weight of carbodihydrazide was added to 50 parts by weight of the aqueous solution to form a product, which was gelled after 5 minutes.

EXAMPLE 5

270 parts by weight of propylene glycol monoetyl ether was introduced into a 5 liter separable flask, heated to 110° C., and substituted by nitrogen, and the following mixture was added dropwise for 1.5 hours:

| | |
|---|---|
| Acrylic acid | 31.5 parts by weight |
| Diacetone acrylamide | 270.0 parts by weight |
| Styrene | 180.0 parts by weight |
| Stearyl methacrylate | 270.0 parts by weight |
| n-butyl methacrylate | 343.5 parts by weight |
| n-butyl acrylate | 30.0 parts by weight |
| i-butyl methacrylate | 225.0 parts by weight |
| PER-BUTYL-O | 2.7 parts by weight |
| (PER-BUTYL-O is a polymerization initializing agent provided by Nippon Oil and Fats Co., Ltd.) | |

After the end of addition, PER-BUTYL-O was added dropwise again for 2 hours. Further, it was kept heated for 4 hours, and then 54 parts by weight of triethylamine was added with stirring well to the resultant material above. Then 1575 parts by weight of water was added with stirring, to have the mixture emulsionized. The emulsion obtained through reduced-pressure distillation had 48.4% of solid content, 0.12 μm of particle diameter, 46 poise of viscosity (measured by a B type viscosity meter at 20° C. and 60 rpm, the same condition of which was used below) and 8.97 pH value.

EXAMPLE 6

An emulsion was obtained by the same method of example 5, with the monomers below:

| | |
|---|---|
| Acrylic acid | 31.5 parts by weight |
| Diacetone acrylamide | 270.0 parts by weight |
| Styrene | 270.0 parts by weight |
| Stearyl methacrylate | 270.0 parts by weight |
| n-butyl methacrylate | 508.5 parts by weight |

The emulsion obtained had 47.8% of solid content, 0.17 μm of particle diameter, 33 poise of viscosity and 9.01 pH value.

EXAMPLE 7

An emulsion was obtained by the same method of example 5, using 2 liter flask in lieu of 5 liter one, in the one third scale. The monomers used are as follows:

| | |
|---|---|
| Acrylic acid | 10.5 parts by weight |
| Diacetone acrylamide | 90.0 parts by weight |
| Styrene | 60.0 parts by weight |
| Stearyl methacrylate | 45.0 parts by weight |
| n-butyl methacrylate | 94.5 parts by weight |
| n-butyl acrylate | 75.0 parts by weight |
| i-butyl methacrylate | 75.0 parts by weight |

The emulsion obtained had 46.7% of solid content, 0.08 μm of particle diameter, 40 poise of viscosity and 9.01 pH value.

EXAMPLE 8

An emulsion was obtained by the same method of example 5, with the monomers below:

| | |
|---|---|
| Acrylic acid | 31.5 parts by weight |
| Diacetone acrylamide | 270.0 parts by weight |
| Styrene | 180.0 parts by weight |
| BLENMER SLMA | 270.0 parts by weight |
| (BLENMER SLMA is a synthesized lauryl methacrylate provided by Nippon Oil and Fats Co., Ltd.) | |
| Stearyl methacrylate | 270.0 parts by weight |
| n-butyl methacrylate | 508.5 parts by weight |
| n-butyl acrylate | 30.0 parts by weight |
| i-butyl methacrylate | 225.0 parts by weight |
| PER-BUTYL-O | 2.7 parts by weight |

The emulsion obtained had 48.2% of solid content, 0.11 micro-meter of particle diameter, 48 poise of viscosity and 9.00 pH value.

EXAMPLE 9

An emulsion was obtained by the same method of example 5, with the monomers below:

| | |
|---|---|
| Acrylic acid | 31.5 parts by weight |
| Diacetone acrylamide | 270.0 parts by weight |
| n-butyl methacrylate | 283.5 parts by weight |
| n-butyl acrylate | 30.0 parts by weight |
| Styrene | 180.0 parts by weight |
| i-butyl methacrylate | 225.0 parts by weight |

The emulsion obtained had 42.8% of solid content, 0.08 micro-meter of particle diameter, 35.9 poise of viscosity and 9.22 pH value.

0.4 mole equivalent amount of carbohydrazide as to the amount of carbonyl group contained in each of the emulsions of examples 5 through 9 (0.8 mole equivalent amount of carbohydrazide as to the amount of functional group of the emulsion) was added to each of the emulsions of examples 5 through 9, and viscosity of each of the emulsions was adjusted by adding water. The resultant emulsions were coated with a bar coater on a treatment panel for checking the coating properties. The results are shown in Table 3.

TABLE 3

| | Characteristics of Coating Seven Days After Painting | | | | |
|---|---|---|---|---|---|
| Example | 5 | 6 | 7 | 8 | 9 |
| Thickness of Coating (μm) | 23 | 30 | 26 | 27 | 23 |
| Pencil Hardness | 2H | 2H | 2H | 2H | 2H |
| Anti-solubility | ◯ | ◯ | ◯ | ◯ | ◯ |
| Erichsen Value (μm) | 7 mm< | 7 mm< | 7 mm< | 7 mm< | 7 mm< |
| Gloss | ◯ | ◯ | ◯ | ◯ | ◯ |
| Water Resistance (submerged into water) | 1 Month OK | 1 Month OK | 1 Month OK | 1 Week OK | 12 Hours OK |

Note: Tests could not be achieved for those samples which were left aside for one day after hydrazide was added.

Obviously from the examples, the resinous composition for paint obtained by adding an easily water soluble dihydrazide compound with 1–5 carbon atoms to a emulsion having pH adjusted above 7 with an alkali has long pot life, and provides paint film having superior properties such as hardness, gloss, solvent resistance, water resistance and the like.

What is claimed is:

1. A method of using a resinous composition for a two-liquid water paint crosslinkable at normal temperature, comprising: applying to a surface to be painted a colloidal dispersion or emulsion containing a carbonyl group and being obtained by copolymerizing a monomer mixture comprising from 5 to 40% by weight of a carbonyl group-containing unsaturated monomer, from 1 to 20% by weight of a carboxyl group-containing unsaturated monomer and from 5 to 40% by weight of a higher alkyl ester monomer of methacrylic acid having from 12 to 26 carbon atoms in the alkyl moiety and from 5 to 89% by weight of other unsaturated monomers to form a copolymer, neutralizing the copolymer with an alkali, dissolving or emulsifying it into water, and adjusting the pH above 7; and a readily water soluble dihydrazide compound having from 1 to 5 carbon atoms with an amount from 0.05 to 1.0 mole equivalent based on carbonyl group content contained in the emulsion, and permitting said composition to cross-link to form a cross-linked paint.

2. The method according to claim 1, wherein said emulsion containing particles formed by the copolymer having a number average molecular weight of 500–150,000.

3. The method according to claim 1, wherein the emulsion having pH of above 7.

4. The method according to claim 1, wherein the emulsion being obtainable by copolymerizing a monomer mixture comprising from 5 to 40% by weight of a carbonyl group-containing unsaturated monomer, from 1 to 20% by weight of a carboxyl group-containing unsaturated monomer, from 5 to 40% by weight of a higher alkyl ester monomer of methacrylic acid having 16 to 22 carbon atoms in the alkyl moiety and from 5 to 89% by weight of other unsaturated monomers.

5. The method according to claim 1, wherein the hydrazide compound comprising one or two compounds selected from the group consisting of those expressed by the general formula (1) and (2) of:

$$H_2N-NH-\underset{\underset{O}{\|}}{C}-NH-NH_2 \quad (1)$$

$$N_2N-NH-\underset{\underset{O}{\|}}{C}-(C_nH_{2n})-\underset{\underset{O}{\|}}{C}-NH-NH_2 \quad (2)$$

(n=0 to 3), malonic dihydrazide, maleic dihydrazide, itaconic dihydrazide and fumaric dihydrazide.

6. The method according to claim 5, wherein the hydrazide compound is:

$$H_2N-NH-\underset{\underset{O}{\|}}{C}-NH-NH_2.$$

7. A resinous composition for a two-liquid water paint crosslinkable at normal temperature, comprising: a colloidal dispersion or emulsion containing a carbonyl group and being obtained by copolymerizing a monomer mixture comprising from 5 to 40% by weight of a carbonyl group-containing unsaturated monomer, from 1 to 20% by weight of a carboxyl group-containing unsaturated monomer and from 5 to 40% by weight of a higher alkyl ester monomer of methacrylic acid having from 12 to 26 carbon atoms in the alkyl moiety and from 5 to 89% by weight of other unsaturated monomers, to form a copolymer, neutralizing the copolymer with an alkali, dissolving or emulsifying it into water, and adjusting the pH above 7; and a readily water soluble dihydrazide compound having from 1 to 5 carbon atoms with an amount from 0.05 to 1.0 mole equivalent based on carbonyl group content contained in the emulsion.

8. The resinous composition according to claim 7, wherein said emulsion containing particles formed by the copolymer have a number average molecular weight of 500–150,000.

9. The resinous composition according to claim 7, wherein the emulsion has a pH of above 7.

10. The resinous composition according to claim 7, wherein the dihydrazide compound is carbodihydrazide.

11. The resinous composition according to claim 7 wherein the alkyl group of said alkyl ester has from 16 to 22 carbon atoms.

12. A method of using a resinous composition for a two-liquid water paint crosslinkable at normal temperature, comprising: applying to a surface to be painted a colloidal dispersion or emulsion containing a carbonyl group and being obtained by copolymerizing, by solution or bulk polymerization without a surfactant, a monomer mixture comprising from 5 to 40% by weight of a carbonyl group-containing unsaturated monomer, from 1 to 20% by weight of a carboxyl group-containing unsaturated monomer and from to 40% by weight of a higher alkyl ester monomer of methacrylic acid having from 12 to 26 carbon atoms in. the alkyl moiety and from 5 to 89% by weight of other unsaturated monomers to form a copolymer, neutralizing the copolymer with an alkali, dissolving or emulsifying it into water, and adjusting the pH above 7; and a readily water soluble dihydrazide compound having from 1 to 5 carbon atoms in an amount from 0.05 to 1.0 mole equivalent based on carbonyl group content contained in the emulsion, and permitting said composition to cross-link to form a cross-linked paint.

* * * * *